United States Patent [19]

Sullivan et al.

[11] Patent Number: 5,587,092
[45] Date of Patent: Dec. 24, 1996

[54] METHOD OF WELDING VANES INTO A SHELL FOR A TORQUE CONVERTER

[75] Inventors: Chris Sullivan, Warren; Jim Wells, Sterling Heights; Michael Prevost, Ypsilanti, all of Mich.

[73] Assignee: Borg-Warner Automotive, Inc., Sterling Heights, Mich.

[21] Appl. No.: 433,947

[22] Filed: May 2, 1995

[51] Int. Cl.⁶ .................................................... B23K 11/26
[52] U.S. Cl. .................... 219/113; 219/117.1; 416/213 R
[58] Field of Search ................................ 219/117.1, 113; 416/213 R, 180

[56] References Cited

U.S. PATENT DOCUMENTS 2,428,134  9/1947  Zeidler ..................................... 416/180
2,448,825  9/1948  Price et al. ............................. 416/213 R
5,113,654  4/1991  Sahashi .................................. 416/213 R

OTHER PUBLICATIONS

GLAMAtronic pamphlet on the Capacitor Discharge Welding Machines.

*Primary Examiner*—Clifford C. Shaw
*Attorney, Agent, or Firm*—Harness, Dickey & Pierce; Greg Dziegielewski

[57] ABSTRACT

A method of assembly of impeller (12) and turbine (14) shells (116) for torque converters (10). Vanes (116) are capacitance discharge welded with a high energy pulse into the shells (112).

10 Claims, 2 Drawing Sheets

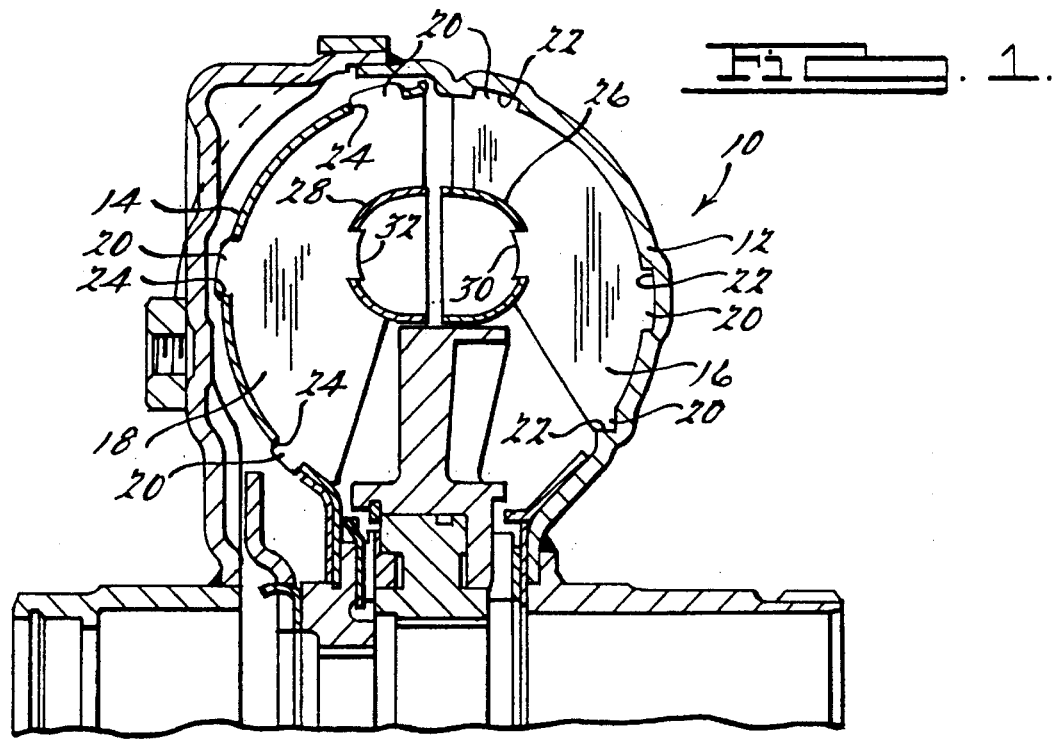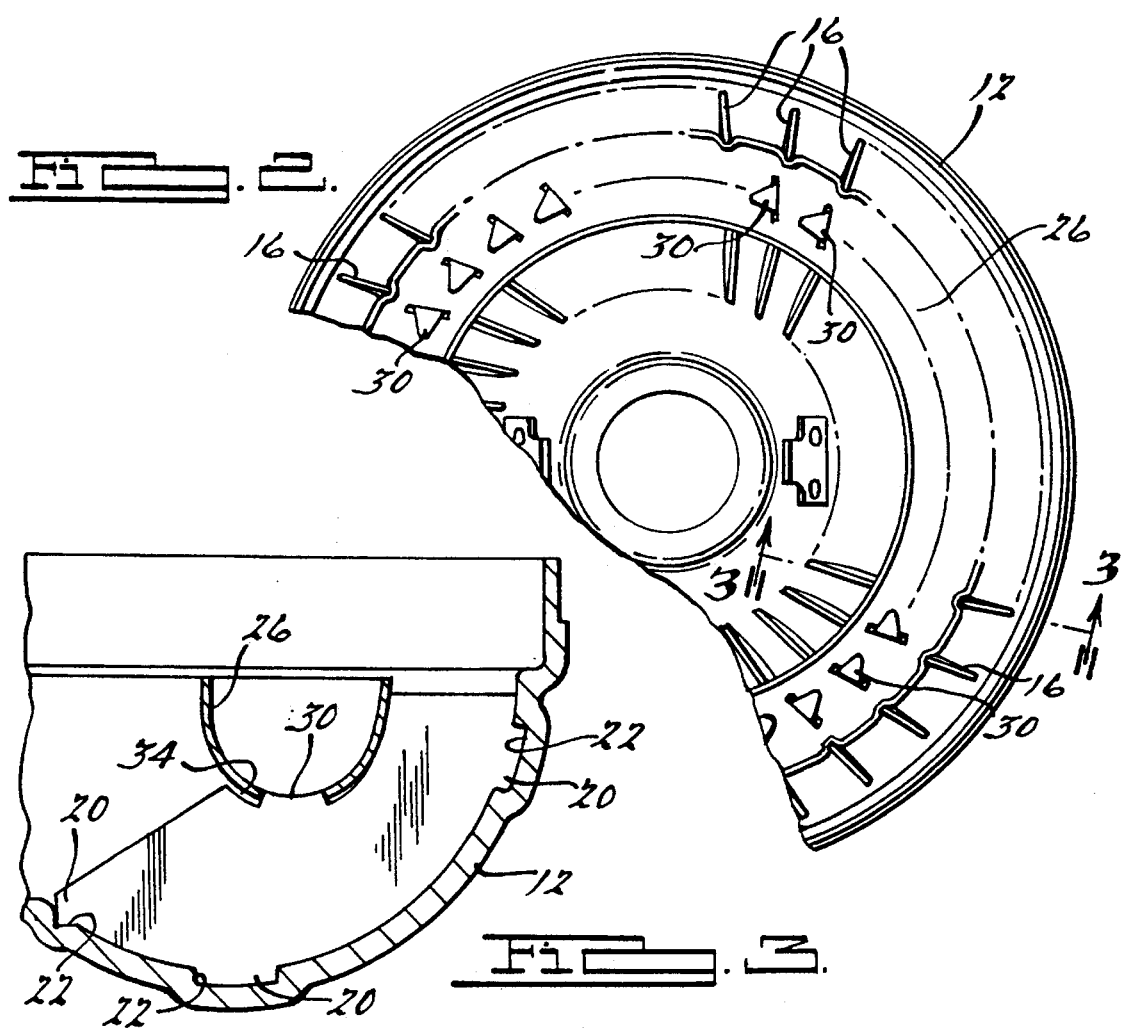

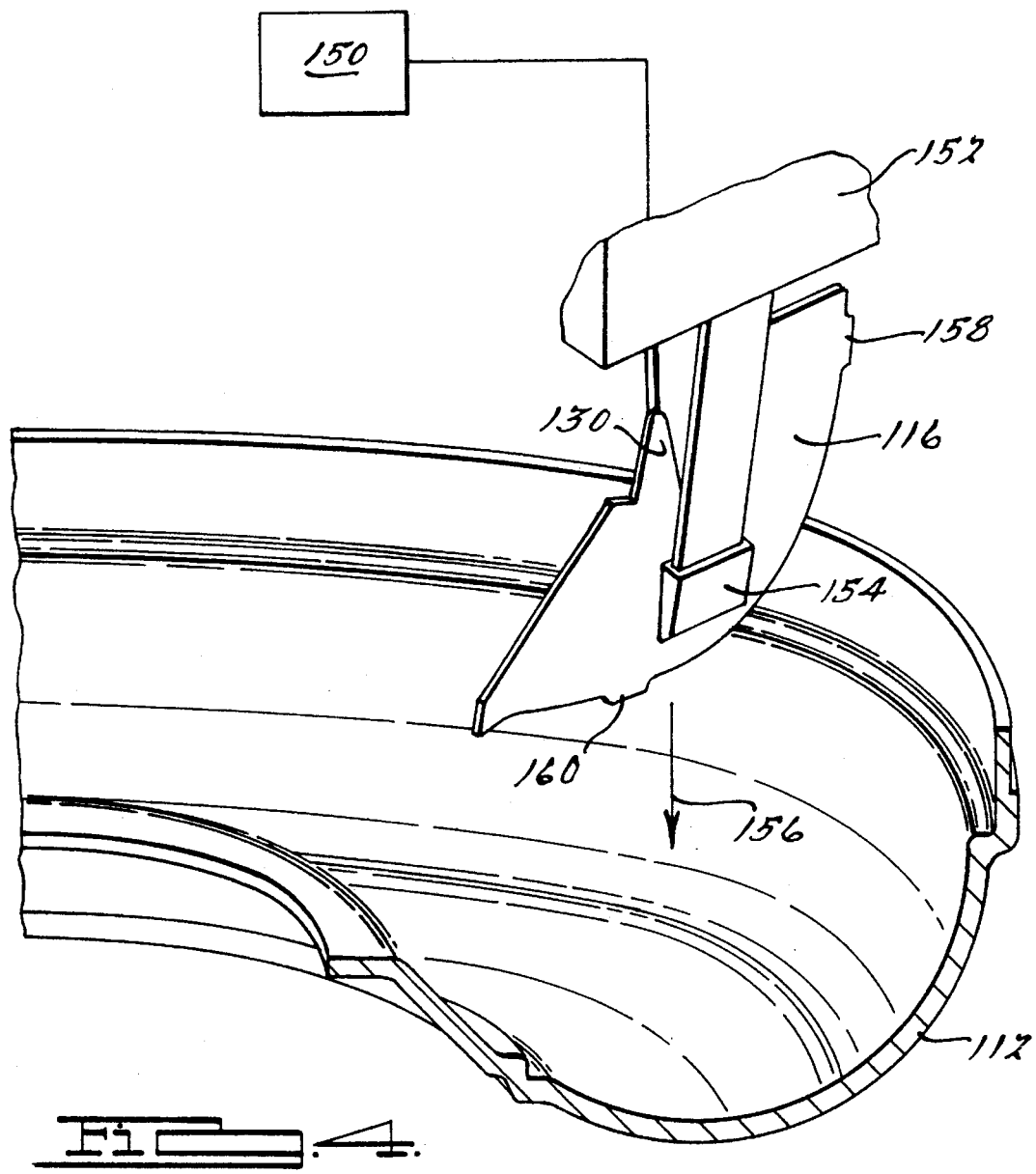
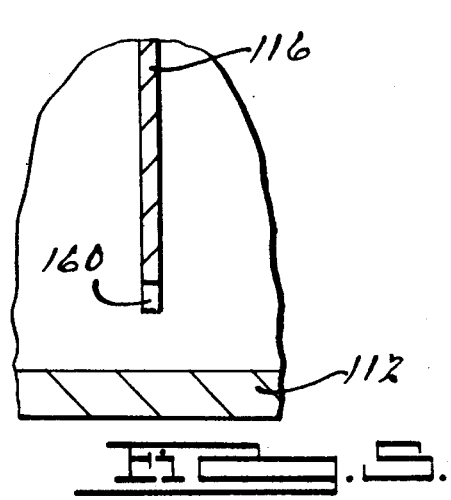
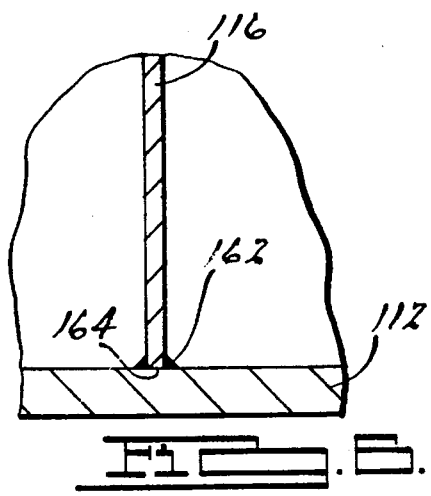

METHOD OF WELDING VANES INTO A SHELL FOR A TORQUE CONVERTER

BACKGROUND OF THE INVENTION

The present invention relates to the assembly of torque converter shells. More specifically the present invention relates to an improved method for attachment of vanes in impeller shells or turbine shells for an automatic transmission of a vehicle.

Torque converters for vehicles have varying vane configurations depending on the type of transmission and the level of performance desired. Typically, these vanes are initially assembled manually by hand or machine into a turbine shell or an impeller shell. The vanes must thereafter be secured therein by rolling the tabs down over a core ring to hold the vane in place prior to brazing functions or the like. Production of the torque converters using these steps has been labor intensive. It has therefore been a goal to reduce labor costs in the production of these parts.

Additionally, in the prior art, indexing tabs are used on the vanes for proper manual assembly of the vanes into the shells. Each of the indexing tabs requires a corresponding indentation or slot in each vane location on the shell, such that the vanes can be inserted in the shells for securement by brazing or the like. Thus, each different shell and vane configuration requires a specific machine for forming of the proper series of indentations in the shell. Because of this, several different machines are required to produce a diverse line of torque convertors. These machines are costly. Therefore, it is desirable to eliminate the need for these machines.

In the past after the vanes are installed in the shell by hand, a core ring is attached over the vanes and secured. The assembly is then brazed by placing a braze paste, braze powder or other braze material in close contact with the vanes and thereafter heating the assembly in an oven. Ideally the vanes are held in place in the shell such that there are very tight tolerances between the vanes and the shell. This allows the braze material to be drawn into the gap between the vane and the shell via capillary action for brazing of the vanes and securing them properly in the shell. However, occasionally during this process due to the differences in the properties of thermal expansion between the shell, which heats slowly, and the vanes, which are heated rapidly, there exists potential for warpage or other deformation of the assembly. During heating of the assembly, for brazing, the parts sometimes move with respect to one another. This causes out of spec conditions in the final part and often ruins the brazing step since larger than normal gaps may form between the vanes and the shell and/or vanes and the core ring. Thus, either the parts must be scrapped or further labor is required to repair certain portions of the completed shell prior to installation of the shells in the transmission.

Therefore, it has been a goal in the art to provide a new method for securement of vanes in turbine or impeller shells for torque converters such that lossage during production is reduced and costs associated with labor and machinery may be reduced during production of such torque converters.

SUMMARY OF THE INVENTION

In accordance with the above goals and objectives the present invention includes a method for assembly of a turbine or impeller for use in a torque converter. In accordance with a first step a shell for an impeller or turbine of a torque convertor is provided. A vane is then provided for insertion into the shell in a predetermined orientation. In the present invention capacitance discharge welding is used for welding of an indexed vane into the shell. In the present invention there is no necessity for having a slot or detent portion in order to index the vane and secure it in the shell. The method of the present invention allows the use of a high energy pulse capacitance discharge welding machine to place the vane in the proper orientation in the shell and substantially simultaneously weld the vane in place. The use of a capacitance discharge welding tool provides a very low heat process which does not warp the vanes nor does it require any type of capillary action to insure securement in the shell. However, if further securement of the vanes is required the vanes are locked in place via the welding operation. Therefore, even if heat stressing occurs during brazing, the vanes will remain in place allowing proper capillary action of the brazed material.

Further features and advantages of the present invention will be gleaned by reference to the Brief Description of the Drawings, the Description of the Preferred Embodiments, and the claims appended hereto.

BRIEF DESCRIPTION OF THE DRAWINGS

FIG. 1 is a sectional view, partially broken away, showing a torque converter assembly typical of the prior art;

FIG. 2 is a plan view, partially broken away, of an impeller assembly typical of the prior art;

FIG. 3 is a detailed sectional view, taken along line 2—2 of FIG. 2, showing a prior art vane as assembled in an impeller;

FIG. 4 is a perspective view illustrating a process, in accordance with the teachings of the present invention;

FIG. 5 is a detailed sectional view showing a vane being inserted into a shell for welding, in accordance with the teachings of the present invention;

FIG. 6 is a detailed sectional view of FIG. 5 showing a vane as welded into the shell, in accordance with the teachings of the present invention.

DESCRIPTION OF THE PREFERRED EMBODIMENTS

Referring now to the drawings FIGS. 1–3 are referred to for general information as to the assembly of torque converters and vanes. As illustrated therein a torque converter 10 is provided which includes an impeller shell 12 and a turbine shell 14. The impeller and turbine shell includes vanes 16 and 18 respectively. In the past the vanes include a plurality of tabs 20 which are inserted, in the case of the impeller shell, into indentations 22 and, in the case of the turbine, into slots 24. Core rings 26 and 28 are secured in the assembly by way of upper tabs 30 and 32.

As stated above, and referring to FIG. 3, the whole assembly in the past has been brazed together. While this has typically been considered the best method of manufacture in the past, as shown in detail in FIG. 3 at times gaps such as shown at 34 may occur during heating of the assembly. The existence of such gaps does not allow a good braze capillary action at these gaps.

Referring now to FIGS. 4–6 there is illustrated the novel method of the present invention. In accordance with the steps of the present invention an impeller or turbine shell 112 is first provided. Thereafter, the vanes are installed in the shell via use of capacitance discharge welding. By this method a series of vanes is welded into the shell.

In accordance with the first step above, shell 112 in the present invention does not include the necessity of any indentations or slots for mounting of a vane 116 therein. Thus, the shell 112 is a conventional shell either for a turbine or an impeller of a torque converter without any indentations or slots. In the method of the present invention the step of forming indexing indentations or slots in the shell is removed saving a labor step and also saving costs with respect to equipment. Thus, in practice a "raw" shell essentially direct from the stamping is used without any preparation steps other than perhaps cleaning of the shell prior to welding.

In a further step, a high energy pulse capacitance discharge welding machine, generally indicated by box 150, is used for welding vane 116 in place in the shell 122. High energy pulse capacitance discharge machines are available commercially. A particularly preferred type of machine is a GLAMAtronic high energy pulse capacitor discharge welding machine manufactured in North America by Henshaw Electric U.S.A. in Clinton Township, Michigan. High energy pulse capacitance discharge welding machine 150 includes an indexing arm 152 which is used to hold the vane 116 and index it to the proper position inside the shell 112. Thus any suitable mechanical indexing device, robotic arm or the like which is capable of consistently indexing the vanes in the proper orientation in the shell 112 may be utilized for this step of the invention. Preferably, the mechanism is indexed such that a vane or a nest of vanes will automatically be inserted and welded and then will move to the next vane location and install another vane until all vanes are installed in the shell. Similarly a nest of vanes could be welded at once and the shell could be indexed to the proper position.

A releasable gripping mechanism 154 which is electrically connected to the vane 116 is provided for insertion of the vane in the shell in its indexed location. The indexing arm 152 then progresses along the direction of the arrow 156 until the vane 116 reaches the grounded shell 112. At this point a high energy pulse is transmitted through the vane to the shell and the vane is instantaneously welded to the shell along the interface therebetween. The high energy pulse allows the weld to be accomplished only at the limited area of contact between the vane and the shell, such as at the consumable tabs, 158 and 160. Thus, there is substantially no detrimental heat applied to the vane during welding and thus no warpage occurs. The energy of the pulse required for welding is varied depending upon the particular situation. In the present invention high energy pulses of from about 10K Joules and 50K Joules are used to minimize the propensity for heat distortion of the part and to limit the weld to only the tabs where it is desired.

In a preferred embodiment consumable tabs 158 and 160 are provided such that as the capacitor discharge high energy pulse occurs the tabs are melted to provide the weld material 162 at the abutment 164 between the vane 116 and the shell 112. However, the vane can also be attached without the use of consumable tabs as will be readily appreciated by those skilled in the art.

After the vanes are secured in the shell via high energy capacitance discharge welding the core ring may be applied over tabs 130 and the tabs may be rolled over as is conventional. Optionally, the core ring could be attached by high energy pulse capacitance discharge welding.

While the insertion of welding of a single vane is illustrated in the drawing it is to be appreciated that a plurality of vanes (i.e. a nest of vanes of two or more) could be installed at a single time with this method via the proper mechanical fixturing and use of the proper welding machine. Additionally, the core ring can be applied as a single unit or as sections of an entire unit with high energy pulse capacitance discharge welding. Furthermore, as an alternate embodiment pre-assembled segments of core ring, and for instance three vanes, could be capacitance discharge welded into the shell during a single step, with a high energy pulse or a series of high energy pulses.

Thus, the method of the present invention is cheaper both in terms of equipment and labor costs since there is no required step of slotting or punching indentations into the shell. The method of the present invention also removes the step of manual insertion of vanes into the slotted or indented locations, since the assembly could be automated. Additionally, in some applications such a process can eliminate the need for brazing of the vanes. Even if brazing is desired the vanes are much more rigidly held in position via the high energy pulse capacitance discharge weld. This allows less relative movement between the shell and vane in the braze furnace resulting in a better braze.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for assembly of a vane into a turbine or impeller for a torque converter, substantially without vane deformation due to heat, comprising:

providing a shell, for an impeller or a turbine, and a vane for insertion into said shell in a predetermined orientation; and, using a high energy pulse from a capacitance discharge welding apparatus for welding of the vane into said shell, without heat deformation of the vane.

2. The method of claim 1 wherein consumable tabs are provided on said vane for welding of said vane to said shell at said consumable tabs.

3. The method of claim 1 further comprising the step of providing a core ring and attaching the core ring to the vanes.

4. The method of claim 3 wherein the core ring is brazedly attached.

5. The method of claim 3 wherein the core ring is attached by high energy pulse capacitance discharge welding.

6. The method of claim 1 wherein a plurality of vanes are welded in place in a single operation.

7. The method of claim 1 further comprising brazing of the vanes after welding of same.

8. The method of claim 1 wherein a pre-assembled segment of a core ring and a plurality of vanes is assembled into the shell as a unit.

9. The method of claim 1 wherein the high energy pulse is from about 10 to about 50 Kilo Joules.

10. A method of attaching at least one vane to a turbine or impeller shell comprising placing the vane in a predetermined proper orientation in said shell and using a capacitance discharge pulse of from about 10 to about 50 Kilo Joules for welding the vane in position.

* * * * *